US010618639B2

(12) United States Patent
Martin et al.

(10) Patent No.: US 10,618,639 B2
(45) Date of Patent: Apr. 14, 2020

(54) METHOD FOR ROTATING AN AIRCRAFT WHEEL

(71) Applicant: MESSIER-BUGATTI-DOWTY, Velizy Villacoublay (FR)

(72) Inventors: Frederic Martin, Velizy-Villacoublay (FR); Yves Courtois de Lourmel, Rambouillet (FR); Maxence Wangermez, Velizy-Villacoublay (FR); Mathieu Daffos, Velizy-Villacoublay (FR); Pierre-Guillaume Phelut, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 15/003,043

(22) Filed: Jan. 21, 2016

(65) Prior Publication Data

US 2016/0214708 A1 Jul. 28, 2016

(30) Foreign Application Priority Data

Jan. 23, 2015 (FR) ..................................... 15 50554
May 22, 2015 (FR) ..................................... 15 54616
May 29, 2015 (FR) ..................................... 15 54888

(51) Int. Cl.
*B64C 25/40* (2006.01)
*B64C 25/36* (2006.01)
(52) U.S. Cl.
CPC ............ *B64C 25/405* (2013.01); *B64C 25/36* (2013.01); *Y02T 50/823* (2013.01)

(58) Field of Classification Search
CPC ....... B64C 25/40; B64C 25/405; B64C 25/36; F16D 25/088; F16D 13/10; B62M 11/02; B62M 11/12; B62M 13/04
(Continued)

(56) References Cited

U.S. PATENT DOCUMENTS 298,206 A * 5/1884 Holt .......................... B02C 4/02
241/143
320,024 A * 6/1885 Weimer .................. F16D 13/10
192/110 R
(Continued)

FOREIGN PATENT DOCUMENTS

DE 735458 C * 5/1943 ............. B64C 25/40
DE 20007553 U1 * 7/2000 ............. B62M 6/75
(Continued)

*Primary Examiner* — Christopher D Hutchens
(74) *Attorney, Agent, or Firm* — Sughrue Mion, PLLC

(57) ABSTRACT

Drive equipment for rotating by friction an aircraft wheel equipped with a drive track and mounted to turn about an axis (X) on an axle of an aircraft undercarriage. The equipment comprise a base (22), a slide (24) mounted on the base on a sliding axis extending in a radial direction (R1, R1), a support (26) pivotable on the slide on an axis parallel to the rotation axis of the wheel; two rollers (21) rotatable on rotation axes parallel to the pivot axis; a central shaft (28) mounted for rotation on the support and being in engagement with the two rollers to provide their rotation; and an actuator (23A, 23B, 30) for moving the slide and the support between a disengagement position with the rollers distant from the wheel drive track and an engagement position with the rollers are held in contact with the drive track of the wheel.

15 Claims, 4 Drawing Sheets

(58) Field of Classification Search
USPC .......... 244/103 S; 474/85–87; 301/6.2, 6.5; 305/33, 184
See application file for complete search history.

(56) References Cited

U.S. PATENT DOCUMENTS

| | | | | | |
|---|---|---|---|---|---|
| 565,691 | A | * | 8/1896 | Reeves | F16D 13/10 192/79 |
| 2,149,513 | A | * | 3/1939 | Fischbach | D08B 69/16 474/118 |
| 2,347,986 | A | * | 5/1944 | Bowerman | B64C 25/40 244/103 S |
| 2,493,275 | A | * | 1/1950 | Thornton | B62M 7/10 180/221 |
| 3,005,510 | A | * | 10/1961 | Phillips | B64C 25/405 180/14.7 |
| 3,178,047 | A | * | 4/1965 | Norton | B65H 81/08 414/432 |
| 3,542,318 | A | * | 11/1970 | Ellsworth | B64C 25/40 244/103 S |
| 3,907,058 | A | * | 9/1975 | Gunderson | B60K 23/04 180/333 |
| 2010/0147995 | A1 | * | 6/2010 | Cros | B64C 25/405 244/50 |
| 2012/0217340 | A1 | * | 8/2012 | Essinger | B64C 25/405 244/50 |
| 2013/0026284 | A1 | * | 1/2013 | Christensen | B64C 25/405 244/50 |
| 2014/0245853 | A1 | * | 9/2014 | Didey | B64C 25/405 74/421 A |
| 2015/0097077 | A1 | * | 4/2015 | Himmelmann | B64C 25/405 244/50 |
| 2015/0321751 | A1 | * | 11/2015 | Mazarguil | B64C 25/34 301/6.2 |
| 2016/0229529 | A1 | * | 8/2016 | Christensen | B64C 25/405 |
| 2017/0001719 | A1 | * | 1/2017 | Didey | B64C 25/405 |
| 2017/0101173 | A1 | * | 4/2017 | Morris | B64C 25/405 |

FOREIGN PATENT DOCUMENTS

| | | | | |
|---|---|---|---|---|
| WO | WO 2015136301 A1 | * | 9/2015 | .......... B64C 25/405 |
| WO | WO 2016200920 A1 | * | 12/2016 | .............. B32B 5/02 |
| WO | WO-2016200920 A1 | * | 12/2016 | .............. B32B 5/02 |

* cited by examiner

METHOD FOR ROTATING AN AIRCRAFT WHEEL

The invention relates to a method for rotating an aircraft wheel.

TECHNOLOGICAL BACKGROUND OF THE INVENTION

Various methods for driving a wheel carried by an aircraft undercarriage have been proposed. In particular, it has been proposed to drive the wheel by means of a drive actuator comprising an output pinion that meshes with a drive ring secured to the wheel. To allow free rotation of the wheel, a clutch device is provided between the drive motor and the output pinion. However, the output pinion remains permanently meshed with the drive ring, which is not favourable from the point of view of safety.

It has also been proposed to use a rotational drive actuator, the output shaft of which carries a roller cooperating with a drive track secured to the wheel. However, this arrangement suffers from various drawbacks. In particular, for reasons of safety, it is necessary to be able to disconnect the roller from the drive track of the wheel, which makes it necessary to provide a movable actuator. This arrangement is particularly difficult to implement. Furthermore, passing the whole of the drive torque through a single roller proves to be difficult.

SUBJECT MATTER OF THE INVENTION

The invention aims to provide means for rotating an aircraft wheel not suffering from the aforementioned drawbacks.

PRESENTATION OF THE INVENTION

To this end, equipment is proposed for rotating by friction an aircraft wheel equipped with a drive track and mounted so as to turn about a rotation axis on an axle carried by a bottom part of an aircraft undercarriage, the equipment comprising:
  a base intended to be fixed to the bottom part of the undercarriage;
  a slide mounted slidably on the base on a sliding axis extending in a radial direction in service;
  a support mounted so as to pivot on the slide on a pivot axis parallel to the rotation axis of the wheel;
  two rollers mounted for rotation on the support on rotation axes parallel to the pivot axis;
  a central shaft mounted for rotation on the support and provided with means for rotating it, the central shaft being in engagement with the two rollers to provide their rotation;
  actuation means for moving the slide and the support between a disengagement position in which the rollers are distant from the wheel drive track and an engagement position in which the rollers are held in contact with the drive track of the wheel with a given bearing force.

Such equipment guarantees an equal bearing of the two rollers on the track as the latter deforms, under a constant bearing force that depends on the torque to be transmitted. Movement of the slide makes it possible to manage the engagement and disengagement of the rollers, in a very simple fashion, without its being necessary to provide a fully movable drive actuator. The latter may be fixed provided that transmission is provided between the output of the actuator and the central shaft capable of accommodating the movement of the slide.

To this end, and according to a particular aspect of the invention, a device is proposed for rotating by friction an aircraft wheel equipped with a drive track and mounted so as to turn about as rotation axis on an axle carried by a bottom part of an aircraft undercarriage, the device comprising:
  at least one item of drive equipment disposed so as to cooperate with the wheel to be driven;
  a rotational drive actuator secured to the bottom part and having an output shaft;
  means for transmitting a rotation movement between the output shaft of the drive actuator and the central shaft of the equipment compatible with the movements of the equipment support.

Preferably, the output shaft of the actuator is mounted so as to turn on a rotation axis parallel to the rotation axes of the rollers, the transmission means comprising a flexible endless drive element, of the chain, belt, cable or similar type, wound around a drive member secured to the output shaft of the drive actuator, and around a member driving the central shaft of the equipment, the flexible element extending towards the central shaft while forming two portions substantially perpendicular to the sliding axis of the slide of the equipment.

Thus the movement of the slide causes a deformation of the path of the flexible element but which practically does not alter its length, so that the transmission of the rotation of the actuator to the rollers continues to be provided whatever the position of the slide, without its being necessary to provide any coupling/decoupling device.

Preferably, the device comprises two items of equipment disposed on either side of the output shaft of the drive actuator, two flexible endless drive elements being each wound around one of the drive members of the central shafts of the items of equipment while having two portions oblique with respect to the sliding axis of the equipment, the two flexible endless drive elements being wound around the output shaft of the actuator.

BRIEF DESCRIPTION OF THE FIGURES

The invention will be understood better in the light of the following description of as particular embodiment of the invention with reference to the accompanying drawings, among which.

DETAILED DESCRIPTION OF AN EMBODIMENT OF THE INVENTION

Figure 1:
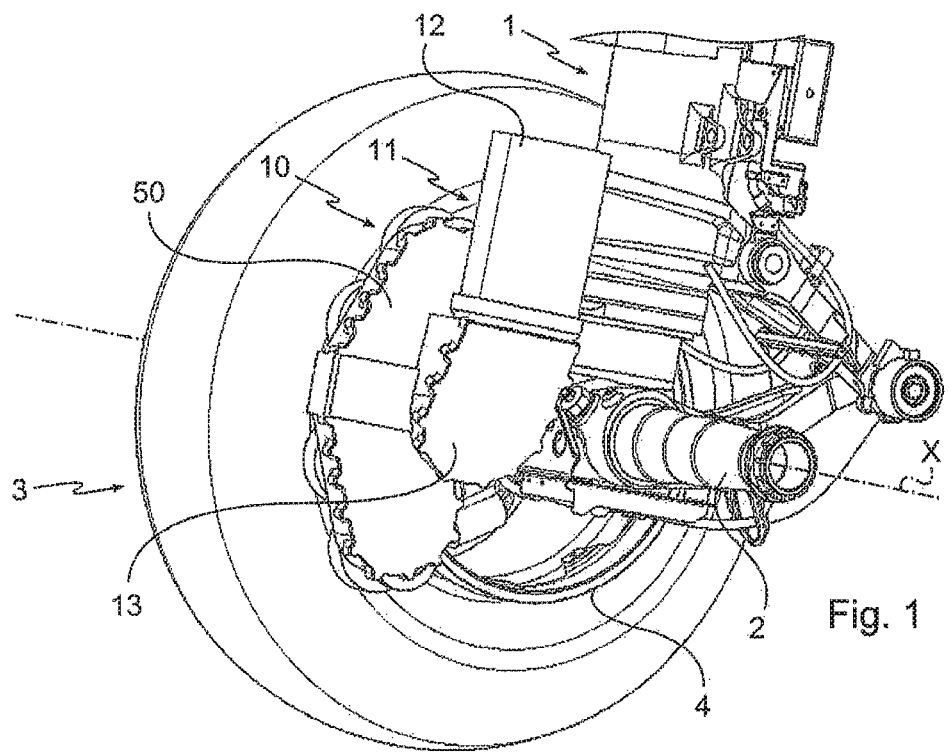
FIG. 1 is a perspective view of the bottom part of an aircraft undercarriage (one of the wheels being omitted for more clarity) equipped with a drive device according to the invention with two items of equipment.
Figure 2:
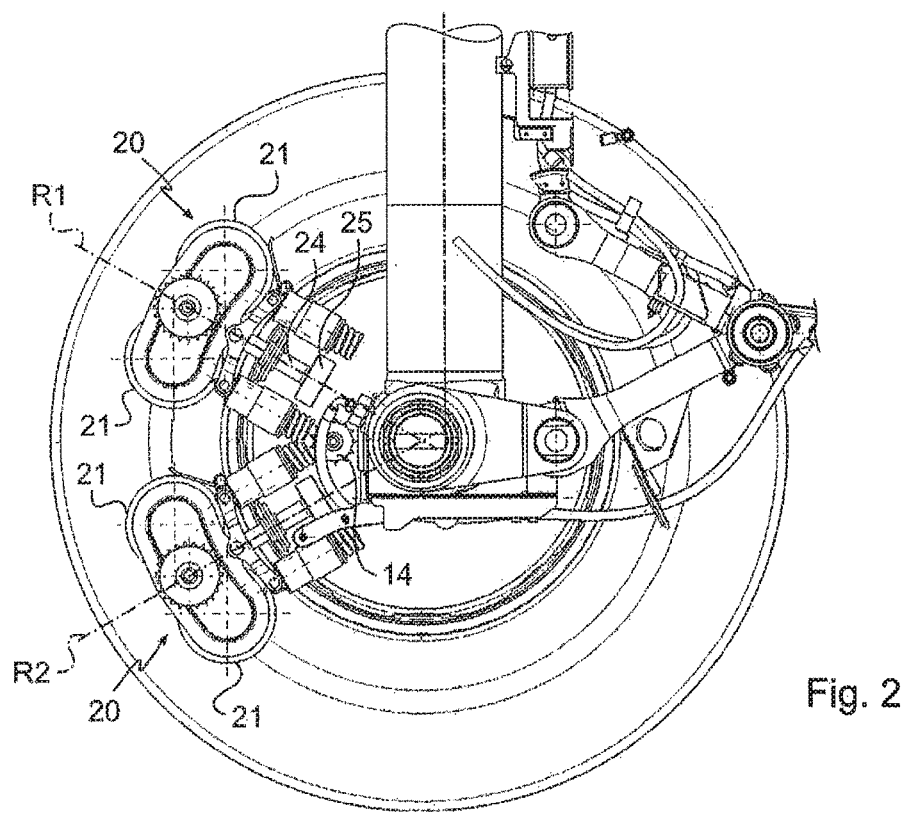
FIG. 2 is a side view of the undercarriage of FIG. 1, showing the radial arrangement of the two items of equipment.

As illustrated in FIGS. 1 and 2, the invention is applicable to an aircraft undercarriage 1 carrying an axle at its bottom part for receiving wheels 3 (only one is visible) and allowing its rotation about a rotation axis X. Each of the wheels is here equipped with a drive track 4 attached to the rim of the wheel. The undercarriage 1 is equipped with a drive device 10 according to the invention comprising a drive actuator 11, the electric motor 12 of which can be seen here, associated with a reduction gear 13 for driving an output shaft (not visible in FIG. 1, but the output wheel 14 of which can be seen in FIG. 2 and FIG. 6). The actuator 11 is associated with two items of equipment 20, each comprising two rollers 21. In FIG. 2 the general arrangement of the two items of equipment 20 in radial directions R1 and R2 can be seen, which therefore extend perpendicular to the axis X while intersecting the latter.

Figure 3:
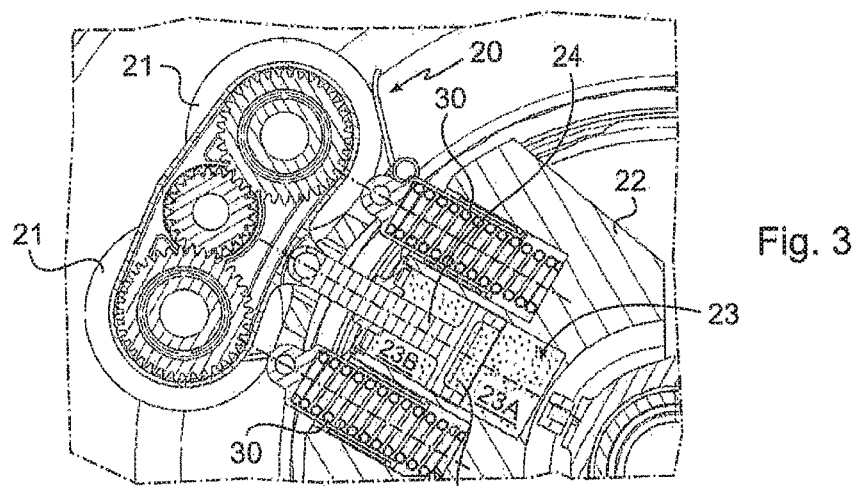
FIG. 3 is a view in cross section of one of the items of equipment on a plane passing through the slide axis of the slide.
Figure 4:
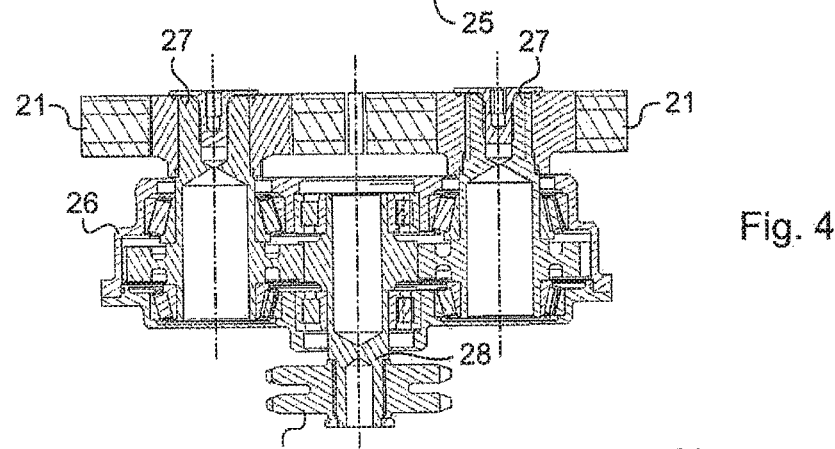
FIG. 4 is a view in cross section of one of the items of equipment on a plane passing through the rotation axes of the rollers.
Figures 5A, 5B:
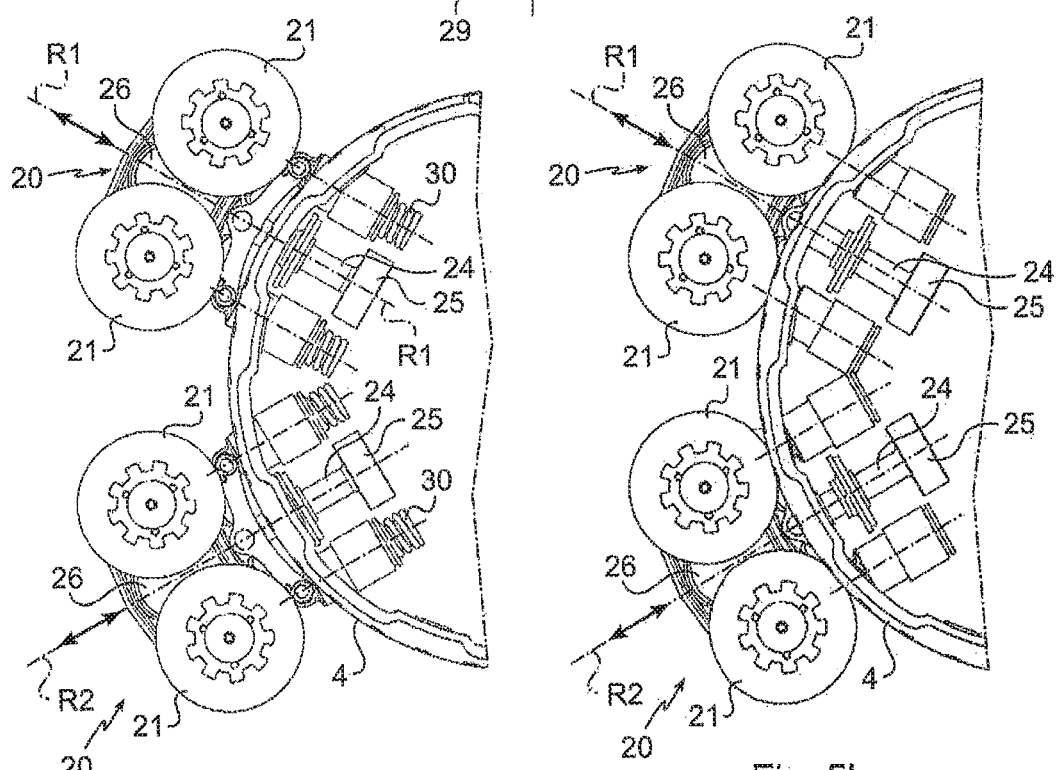
FIGS. 5a and 5b are diagrams showing the disengagement and engagement positions of the rollers on the drive track of the wheel.

One of the items of equipment is illustrated in detail in FIGS. 3 and 4. Each item of equipment comprises a base 22 secured to the bottom part of the undercarriage 1. The base 22 defines a cylindrical cavity 23 the central axis of which coincides here with the radial direction (R1 or R2). A slide 24 is secured to a piston 25 mounted for sealed sliding in the cavity 23 in order to define, on either side of the piston 25, two hydraulic chambers 23A, 23B supplied by respective hydraulic ports (not visible here). The slide 24 has an end forming a lug on which a support 26 is mounted for pivoting on an axis parallel to the axis X. The support receives two shafts 27 supporting the rollers 21, which are mounted for rotation on axes parallel to the axis X. The support also receives a central shaft 28, mounted for rotation on an axis parallel to the axis X, which meshes with the shafts 27 and which is provided with a drive wheel 29. The slide 24 forms with the cavity 23 a hydraulic actuator allowing the controlled movement of the support 26 between a disengagement position illustrated in FIG. 5a in which the rollers 21 are distant from the drive track 4, and an engagement position illustrated in FIG. 5b in which the rollers 21 are in contact with the drive track 4. Elastic means 30 are arranged so as to push the slide and support to a disengagement position. In the case here, springs 30 are disposed on the equipment 20 in order to exert on the support 26 a force tending move the slide 24 and the support 26 towards the disengagement position.

These springs 30 allow a single-acting actuation of the support. This is because it suffices to put the two hydraulic chambers 23A, 23B on hydraulic return to cause the movement of the slide 24 and the support 26 towards the disengagement position, which is a stable position. In order to make the rollers 21 come into the engagement position, it suffices to connect the external hydraulic chamber 23B to the pressure source of the aircraft and thus to maintain it under pressure, in order to provide a constant bearing force of the rollers 21 on the drive track 4, determined by the pressure of the hydraulic circuit.

The fact that the support 26 is free to pivot guarantees contact of the two rollers on the drive track with a substantially constant pressure force, whatever the deformation of the drive track when the aircraft is running.

Preferably, the ports supplying the external hydraulic chambers 23B of the two items of equipment are connected together, in the same way as the ports supplying the internal hydraulic chambers 23A are connected together. Thus only two hydraulic lines have to descend along the undercarriage.

Figure 6:
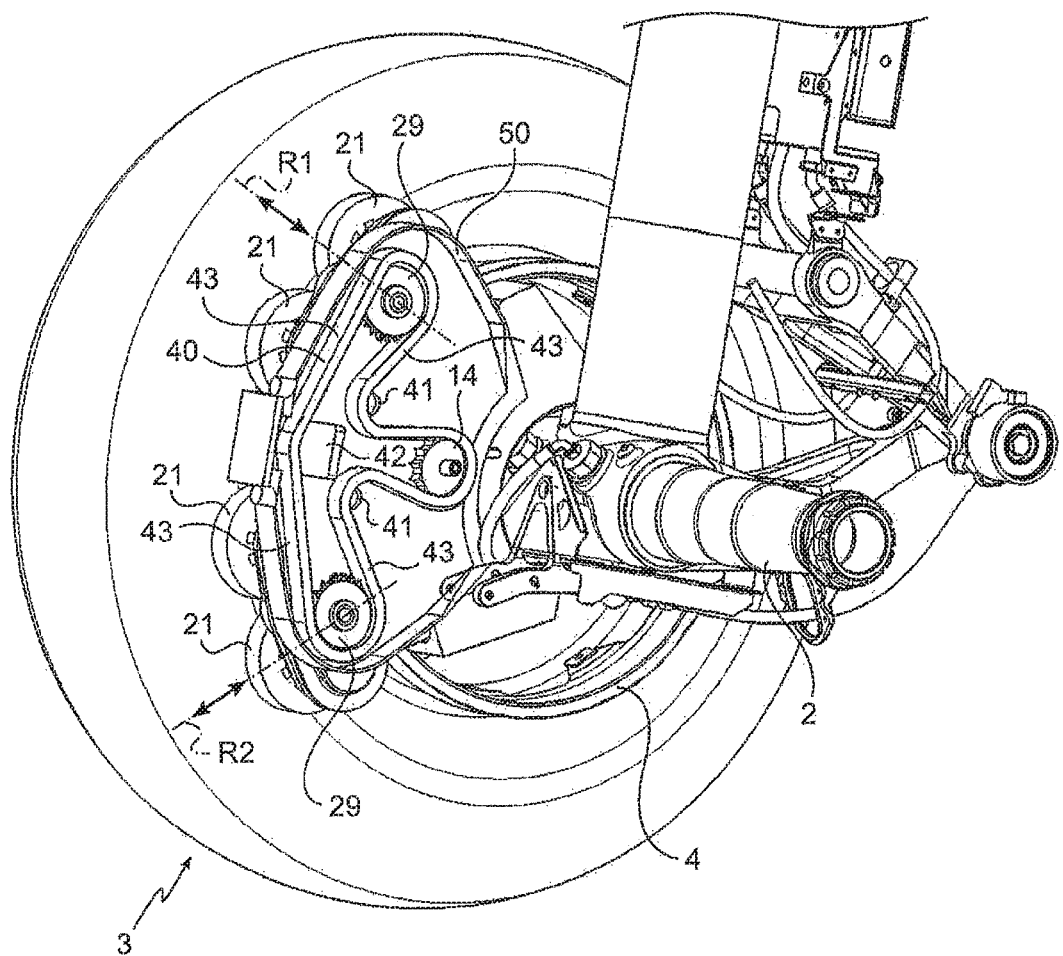
FIG. 6 is a view similar to the one in FIG. 1, the drive actuator and its casing having been omitted in order to show the flexible endless drive element that rotates the rollers of the two items of equipment.

As can be seen in FIG. 6, the output wheel 14 secured to the output shaft of the drive actuator is able to rotate on an axis parallel to the axis X that extends here substantially in a plane median to the directions R1 and R2, A chain 40 is wound around the output wheel 14 and around the drive wheels 29 of the central shafts 27 of the items of equipment. Here the chain is protected by a casing 50 (visible in FIG. 1), one of the shells of which has been removed in FIG. 2 in order to reveal the chain 40. The chain 40 is forced by return pulleys 41 and a runner 42 to present, towards each item of equipment, portions 43 that extend in directions oblique to the radial directions R1 and R2, close to the perpendicular. Thus, when the supports 26 move between the engagement and disengagement positions, the portions 43 follow the movements of the drive wheels 29 indicated by the double arrows, without any appreciable variation in length of the portions 43, so that the transmission by the chain 40 is compatible with the movement of the supports 26, without there being any need for a decoupling member.

Thus the structure of the drive device according to the invention is very simple, with a fixed drive actuator and two hydraulic supplies connected to the hydraulic ports of the bases 22, with a particularly simple actuation sequence. Moving parts are reduced with a strict minimum. No decoupling of the transmission is necessary.

Figure 7:
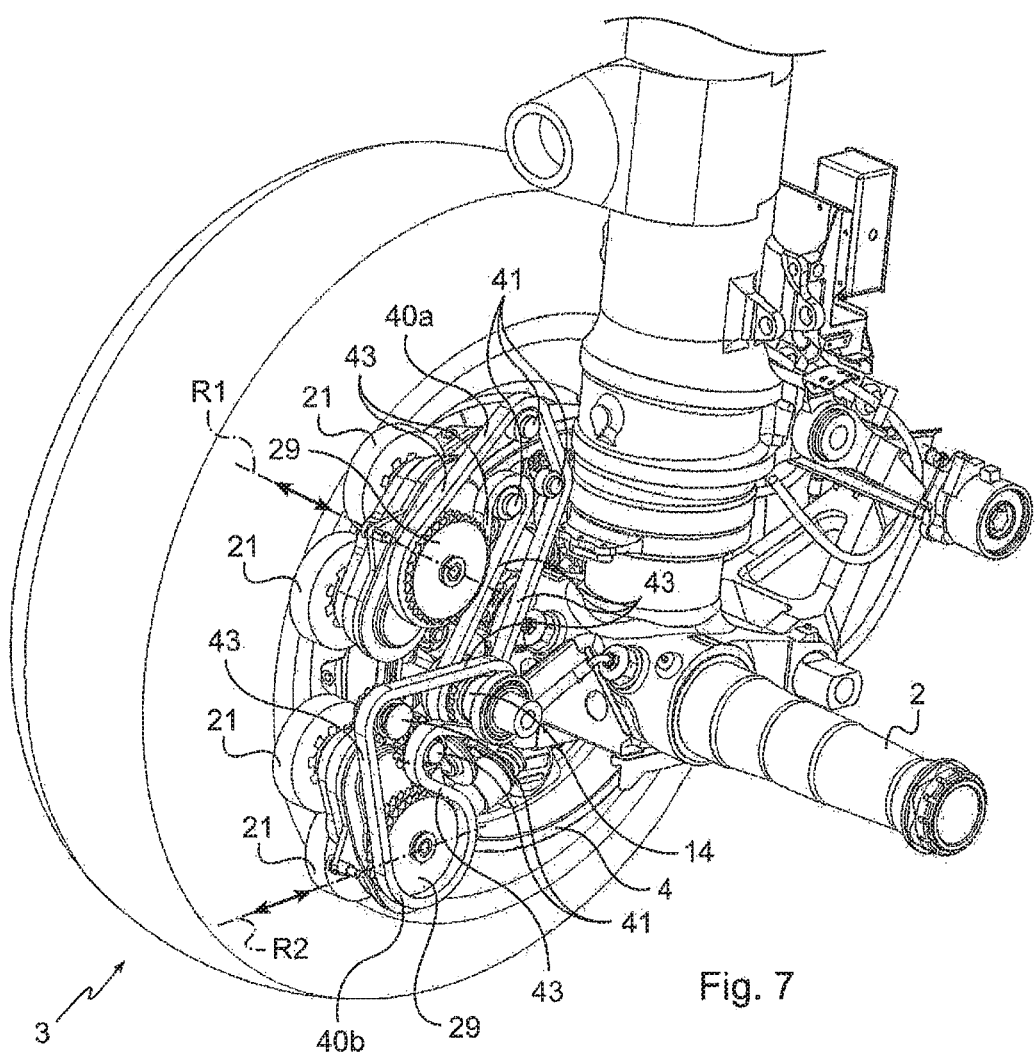
FIG. 7 is a view similar to the one in FIG. 1, showing a variant embodiment of the invention using one flexible endless drive element per item of equipment.

According to a variant illustrated in FIG. 7, the output wheel 14 secured to the output shaft of the drive actuator turns on an axis parallel to the axis X, which extends here substantially in a plane median to the directions R1 and R2. Two chains 40a, 40b are wound around the output wheel 14 of the actuator as well as respectively around one of the drive wheels 29 of the central shafts 27 of the items of equipment. Here the chains 40a, 40b are protected by a casing 50 (visible in FIG. 1), one of the shells of which has been removed in FIG. 7 in order to reveal the chains 40a, 40b. The chains 40a, 40b are forced by return pulleys 41 and a runner 42 to present, towards each item of equipment, portions 43 that extend in directions oblique to the radial directions R1 and R2. Thus, when the supports 26 move between the engagement and disengagement positions, the portions 43 follow the movements of the drive wheels 29 indicated by the double arrows, without any appreciable variation in length of the portions 43, so that the transmission by the chain 40 is compatible with the movement of the supports 26, without there being any need for a decoupling member.

Moreover, it is possible to choose the orientations of the portions 43 so as to guarantee equality of the radial forces exerted by the tension of the portions 43 on the rollers of a given module, whatever the torque transmitted by the actuator. A simple static equilibrium makes it possible to choose the directions of the two portions in order to obtain this highly advantageous effect, which occurs in both directions of rotation of the rollers.

Furthermore, the portions 43 of the two chains 40*a*, 40*b* are all oriented in the same direction, so that the tensioned portions are situated on the same side of the drive members of the items of equipment and pull on the latter in the same direction.

According to another variant of the invention illustrated in FIG. 8, the rollers are again driven by a chain 60, but the latter is wound between the drive wheel 29 and an auxiliary wheel 61 that is mounted so as to rotate directly on the item of equipment, and which therefore moves with the latter when the latter slides. The chain 60 thus has two portions 63 that are substantially parallel to the sliding axis of the item of equipment. The output shaft of the actuator comprises a toothed output wheel 14 that cooperates with a toothed wheel secured to the auxiliary wheel 61 at least when the rollers are brought in contact with the drive track of the wheel. The direction of the portions of the chain means that the tension on the drive portion tends to press the rollers against the track, thus contributing to the pressure force of rollers against the track, which reduces accordingly the force to be exerted by the hydraulic actuator to press the rollers against the track.

Figure 8:
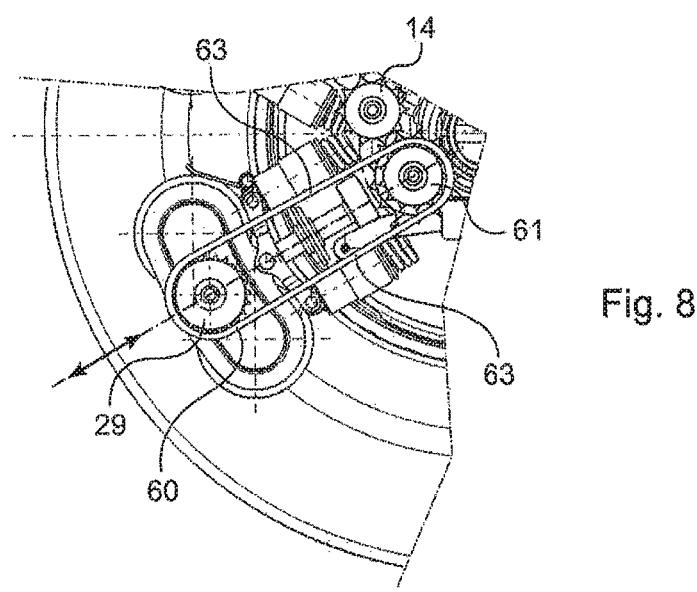
FIG. 8 is as side view of the undercarriage showing a variant embodiment of the device using one flexible endless drive element per item of equipment.

According to another variant embodiment, each item of equipment is associated with a chain 60 as in the variant illustrated in FIG. 8. However, in this variant, no hydraulic actuator is formed between the slide 24 and the base 22.

The actuation means that move the slide and the support counter to the springs 30 are formed by the chain 60 itself, the tension of which when the drive actuator is activated suffices to counter the action of the springs 30 and moves the rollers 21 towards to the drive track 4 and holds the rollers 21 against the latter.

According to a variant, the auxiliary wheel 61 can be moved for example radially or circularly around the output wheel 14, and the item of equipment is provided with a pressure actuator, for example of the electromechanical type, moving the auxiliary wheel 61 in order to increase the tension of the chain 60 and thus control the pressure force of the rollers 21 on the drive track 4.

In practice, the auxiliary wheel 61 may be mounted at the end of a rocking arm, the pressure actuator acting on the rocking arm in order to move the auxiliary wheel 61 and consequently to play the same role as the aforementioned actuation means by moving the slide and the support counter to the springs 30, via the chain 60.

The invention is not limited to what has been described but encompasses any variant falling within the scope defined by the claims.

In particular, although here the drive device comprises two items of equipment, it would be possible to use a single item of equipment, or on the contrary more than two items of equipment, provided that the member transmitting movement between the fixed drive actuator and the central shaft of the item or items of equipment is compatible with the movement of the items of equipment.

Although the transmission member illustrated here is a chain, it may be a case more generally of any endless flexible drive element, such as a belt or a cable disposed as described above, and, even more generally, any transmission member compatible with the movement of the support of the item of equipment, such as for example transmission by universal joints with as fluted shaft of variable length.

Finally, although in the examples illustrated the support of the rollers is moved either by an electromechanical hydraulic actuator or by a pressure actuator moving an auxiliary wheel, the invention covers any method for moving the support between the engagement position and the disengagement position, provided that the support can pivot to enable the two rollers to come into abutment on the drive track evenly.

The invention claimed is:

1. A drive equipment mountable on a bottom part of an aircraft undercarriage for selectively rotating an aircraft wheel by frictional engagement with a drive track mounted to the wheel so as to turn the wheel about a wheel rotation axis on an axle carried by the bottom part of the aircraft undercarriage, the equipment comprising:
    a base fixable to the bottom part of the aircraft undercarriage;
    a slide mounted slidably and not rotatably on the base on a sliding axis extending in a direction in service perpendicular to the wheel rotation axis;
    a support mounted so as to pivot on the slide on a pivot axis parallel to the wheel rotation axis;
    two rollers mounted for rotation on the support on roller rotation axes parallel to the pivot axis;
    a central shaft mounted for rotation on the support and provided with means for rotating the central shaft, the central shaft being in engagement with the two rollers to provide the rotation of the two rollers; and
    an actuator for moving the slide and the support between a disengagement position in which the rollers are distant from the drive track of the wheel and an engagement position in which the two rollers are held in contact with the drive track of the wheel with a given bearing force, so that the two rollers rotate the wheel by friction when the central shaft is driven in rotation.

2. The drive equipment according to claim 1, in which the actuator comprises a piston secured to the slide and sliding sealingly in a cylindrical cavity of the base so as to define therein two hydraulic chambers to form the hydraulic actuator for hydraulically moving the slide and the support between the engagement and disengagement positions.

3. The drive equipment according to claim 2, including spring means arranged so as to push the slide and the support towards the disengagement position.

4. A drive device for rotating by friction comprising:
    at least one drive equipment according to claim 1 disposed so as to cooperate with the wheel to be driven;
    a rotational drive actuator secured to the bottom part of the aircraft undercarriage and having an output shaft; and
    a motion transmitter for transmitting a rotation movement between the output shaft of the drive actuator and the central shaft of the equipment compatible with the movements of the equipment support.

5. The drive device according to claim 4, in which the output shaft of the drive actuator is mounted so as to turn on a shaft rotation axis parallel to the roller rotation axes, the motion transmitter comprising a flexible endless drive element wound around a drive member secured to the output shaft of the drive actuator, and around a member driving the central shaft of the drive equipment, the flexible element extending towards the central shaft while forming two portions substantially perpendicular to the sliding axis of the slide of the drive equipment.

6. The drive device according to claim 5, comprising two drive equipment disposed on either side of the output shaft of the drive actuator, the flexible endless drive element being wound around two drive members of the central shafts of the drive equipment.

7. The drive device according to claim 5, in which the flexible endless drive element is also wound around an auxiliary wheel secured to the drive equipment, so that the flexible element defines two portions substantially parallel to the sliding axis of the drive equipment, the auxiliary wheel being rotated by the drive actuator at least when the rollers are in contact with the track on the wheel.

8. The drive device according to claim 7, in which the actuator of the drive equipment consists of the flexible endless drive element, the tension of which when the drive actuator is activated causes the movement of the rollers and the holding of the rollers in the engagement position.

9. The drive device according to claim 8, in which auxiliary wheel can be moved radially by a pressure actuator in order to selectively increase the tension of the flexible endless drive element so as to control the pressure force of the rollers on the drive track.

10. The drive device according to claim 4, in which the output shaft of the drive actuator is mounted so as to turn on a shaft rotation axis parallel to the roller rotation axes, comprising two drive equipment, the motion transmitter comprising two flexible endless drive elements wound around one of the drive members of the central shafts of the drive equipment while having two portions oblique with respect to the sliding axis of the drive equipment, the two flexible endless drive elements being wound around the output shaft of the drive actuator.

11. The drive device according to claim 10, in which the portions of the flexible endless drive elements are oriented in directions determined so as to guarantee equality of the radial forces exerted by the rollers of a given drive equipment, whatever the torque transmitted by the drive actuator.

12. The drive device according to claim 10, in which all of the portions of the flexible elements are oriented in the same direction.

13. The drive equipment according to claim 1, wherein said drive track has an inside surface disposed towards said wheel rotation axis and defining an inside location and an outside surface disposed away from said wheel rotation axis and defining an outside location, and, wherein said support and said two rollers are disposed at said outside location while said slide is disposed at said inside location and extends to said outside location.

14. The drive equipment according to claim 13, wherein said central shaft is disposed at said outside location.

15. The drive equipment according to claim 13, wherein said slide, at said inside location, has a hydraulically moveable piston coupled thereto.

* * * * *